Nov. 4, 1969  H. C. HUBBARD  3,476,223
ELECTROMAGNET

Filed Jan. 17, 1968  2 Sheets-Sheet 1

INVENTOR.
HAROLD C. HUBBARD
BY
Barnes, Kisselle, Raisch & Choate
ATTORNEYS

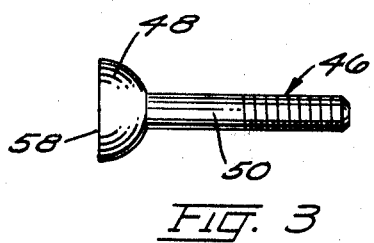
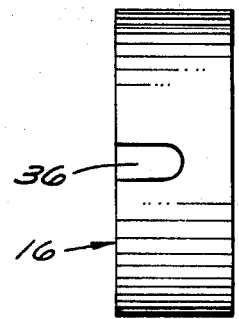
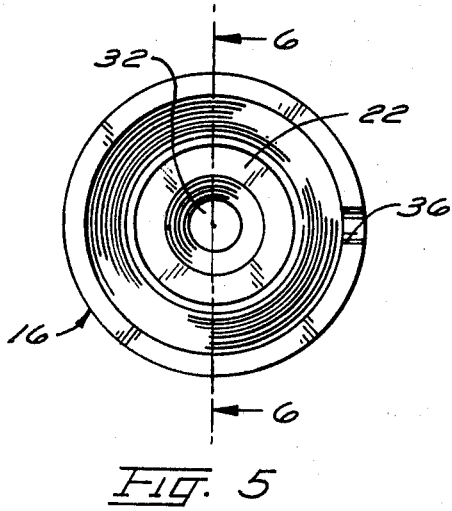
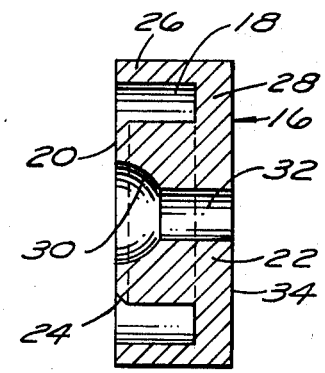
INVENTOR.
HAROLD C. HUBBARD

United States Patent Office 3,476,223
Patented Nov. 4, 1969

3,476,223
ELECTROMAGNET
Harold C. Hubbard, Lansing, Mich., assignor to Motor Wheel Corporation, Lansing, Mich., a corporation of Ohio
Filed Jan. 17, 1968, Ser. No. 698,506
Int. Cl. B60l 7/00; H01f 7/08, 5/00
U.S. Cl. 188—164                    6 Claims

ABSTRACT OF THE DISCLOSURE

An electromagnet for an electric brake mechanism in which the magnet body swivels on a support pin having a half-ball head received in a mating socket of the body and arranged to provide increased magnetic efficiency and break-away release action from the brake armature plate.

---

This invention relates to the construction of an improved electromagnet of the type used in an electrically actuated braking system.

In present conventional electrically actuated brake systems, such as disclosed in United States Patents 2,273,065 and 3,244,944, a lever arm is pivotally secured to the backing plate in such a manner that pivoting of the lever arm moves the brake shoes into contact with the braking surface of the brake drum. An electromagnet is secured to the free end of the lever arm and in the de-energized condition of the electromagnet the same is maintained by the lever arm in loose sliding contact with the armature plate which in turn is fixed to and rotates with the brake drum. When the electromagnet is energized a magnetic field is generated which attracts the electromagnet more firmly against the armature plate, causing the electromagnet to be frictionally dragged through a limited arc of pivotal movement by the rotating armature plate and thus actuating the brake mechanism to move the brake shoes into contact with the braking surface of the brake drum to effect the desired braking action. It can readily be seen that the constant loose sliding frictional contact, as described above, between the armature plate and electromagnet results in a large amount of wear on the frictionally engaged surfaces which greatly reduces the life expectancy of the electromagnet.

It is the object of this invention to provide an electromagnet which increases the braking capability of an electrically actuated braking system.

Another object is to provide an electric brake electromagnet that rides free of or out of constant contact with the armature plate in the de-energized condition of the brake, contacting said plate only when a braking application is called for and thereby overcoming the aforementioned wear problem.

Yet another object is to provide an electromagnet with a frictionally engaged surface having an increased working area without increasing the overall size of the electromagnet.

Still another object is to provide a brake electromagnet having a built-in mechanical action that automatically overcomes the anti-release effect caused by residual magnetism.

Other objects as well as the advantages and features of the present invention will be apparent from the following detailed description taken in conjunction with the accompanying drawings wherein:

FIG. 3 is a side elevation of the pivotal support pin shown by itself.

FIG. 4 is a side elevation of the magnet body shown by itself depicting the wire exit slot in the outside wall.

FIG. 5 is an end elevational view of the magnet body looking at the friction faces of the same.

FIG. 6 is a vertical sectional view taken on line 6—6 of FIG. 5.

Figure 1:
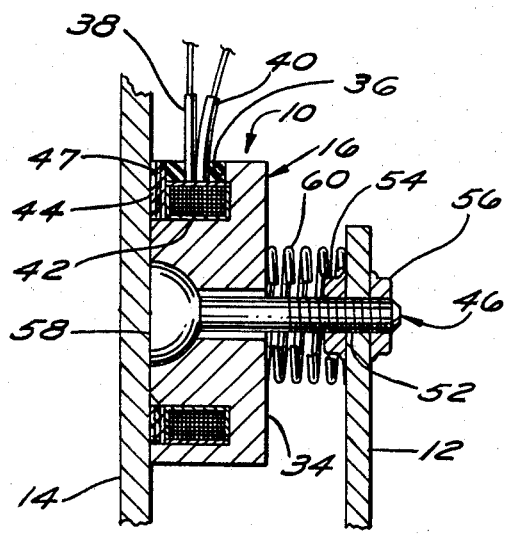
FIG. 1 is a vertical center sectional view of the complete electromagnet assembly and a portion of the associated armature plate and lever arm, depicting these parts in their braking mode.
Figure 2:
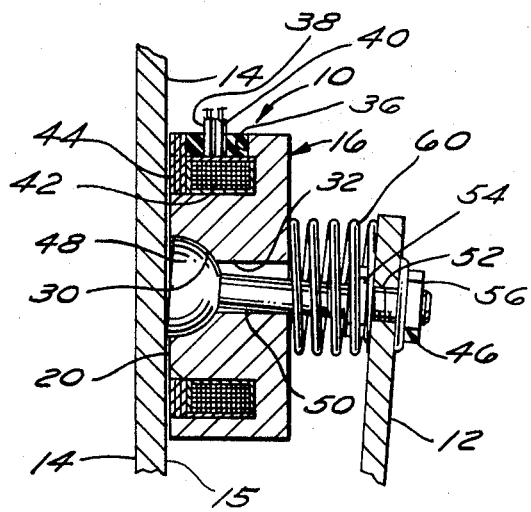
FIG. 2 is a sectional view similar to FIG. 1 depicting the mechanical action of the electromagnet support pin in overcoming the residual magnetism effect.

Referring in more detail to the drawings, an electromagnet 10 constructed in accordance with the present invention and representing a preferred but exemplary embodiment thereof is shown in FIGS. 1 and 2 operatively associated with a lever arm 12 and armature plate 14 of a conventional electric brake mechanism. Electromagnet 10 has a body 16 (FIGS. 4, 5 and 6) with an annular groove 18 extending axially inwardly from the friction face 20 of body 16. Groove 18 is defined by a radially inner core portion 22 of body 16, which has a chamber 24 at the junction of its outer periphery and face 20, by a radially outer annular portion 26 concentric with core 22, and by a radial back wall 28 connecting portions 22 and 26. Body 16 is made from a low reluctance material such as iron and has a centrally located axially extending through-passage consisting of a half-spherical cavity 30 in face 20 and a cylindrical bore 32 extending from the center of cavity 30 to the back 34 of body 16. Portion 26 has a radial slot 36 (FIG. 4) extending axially inwardly from face 20 to provide an aperture for lead wires 38 and 40 of an electromagnet coil 42 (FIG. 1) which is suitably mounted in groove 18. A flat friction washer 44 (FIG. 1) is cemented in place within groove 18 against the outer face of coil 42, and has a radial tab 47 extending radially outwardly in slot 36.

A support pin 46 (FIGS. 1, 2 and 3) has a semi-spherical head 48 shaped to fit cavity 30, and has a cylindrical shank 50 which is smaller in diameter and longer than bore 32 so as to extend beyond the back face 34 of body 16 and then through a hole 52 in arm 12 (FIGS. 1 and 2). Shank 50 may be threaded to receive nuts 54 and 56 for rigidly securing pin 46 to lever arm 12. Head 48 is designed to fit snugly in cavity 30 to increase the magnetic pull and thus presents, magnetic-wise, a solid center pole to core 22 the outer periphery of which is chamfered for magnetic reasons and plate 14 thereby increases the magnetic flux density of the center in the energized mode of the electric brake (FIG. 1).

The complete electromagnet assembly 10 (FIG. 1) is suspended from lever arm 12 so as to ride free from contact with plate 14 in the de-energized condition of the electromagnet, thereby increasing the life expectancy of the electromagnet. When a braking effort is desired, coil 42 is energized from the usual source of direct current, such as the towing vehicle battery, by operating a suitable controller (not shown), and the resultant magnetic attraction between the rotating armature plate 14 and electromagnet 10 causes the electromagnet to be attracted into firm frictional contact with plate 14, thereby pivoting arm 12 through an arc to actuate the brake shoes (not shown) into contact with the braking surface of the brake drum (not shown).

The initial magnetic attraction force should be sufficient to draw body 16 tightly against plate 14 so that head 48 is fully seated in cavity 30 wtih the flat end face 58 of head 48 flush with and parallel to face 20. Due to the respective axis of shank 50 and bore 32 being coincident, when face 58 is flush with face 20 upon head 48 being fully seated in cavity 30 body 16 tends to "snap" into this properly aligned position pin 46, the magnetic attraction increases rapidly as the air gap between face 20 and plate 14 decreases. The increased flux density between head 48 and core 22 also greatly increases the magnetically induced frictional grip between these parts, thereby tending to hold them in coaxial alignment once this relationship is established.

Enough magnetism may be retained in electromagnet 10 to cause it to cling to plate 14 and resist efforts to break this magnetic contact, thus the brake is held on. The present invention overcomes this problem by providing a radial clearance between shank 50 and bore 32 which allows the pin 46 to pivot about ball joint formed by head 48 and cavity 30. This will happen on residual only when residual magnetism is great enough to hold the body of the puck against plate 14 but allows the flat end face 58 to break away from plate 14, thus breaking residual, at which time the puck itself will break away due to pressures on shank 50. In effect when the vehicle starts moving again, electromagnet 10 will start moving with plate 14, but arm 12, being already in the "full-on" position, will strongly resist such movement and tend to hold the shank end of pin 46 stationary. Since head 48 moves with body 16, pin 46 will pivot relative to body 16 and plate 14, thereby prying body 16 axially away from face 15 of plate 14, thereby breaking the metal-to-metal magnetic path for the residual magnetism and opening an air gap as pin forces electromagnet 10 toward its at-rest position out of contact with plate 14. The play in and flexibility of lever arm 12 is sufficient to permit such pivotal movement of pin 46 out of perpendicularity with plate 14, as seen in FIG. 2, at least momentarily, which is all that is required to release the electromagnet from the residually induced clinging condition. Once the residual contact is broken, the electromagnet does not retain sufficient residual magnetism to re-establish the unwanted magnetic contact. The magnetic attraction between head 48 and body 16 is also appreciably reduced, permitting body 16 to swivel relatively freely on pin 46 to accommodate any wobbly condition which may exist in plate 14.

Due to the improved efficiency of electromagnet 10 resulting from the increased magnetic conductance as well as increased frictional face area provided by head 48, a marked increase is obtained in the pulling force exerted by the electromagnet on lever arm 12 when the electromagnet is energized.

If desired, a coil spring 60 may be interposed between arm 12 and face 34 of body 16 to lightly bias body 16 toward head 48 and thereby reduce vibration of body 16 on pin 46 in the de-energized state of the brake. Spring 60 also assists in the aforementioned magnetically induced centering or alignment of body 16 on pin 46 upon energization of the brake.

I claim:

1. An electromagnet for an electric brake mechanism comprising
    a body of low reluctance magnetic material,
    an electromagnet coil carried in said body,
    friction face means at one end of said body adapted for sliding contact with an armature plate of the electric brake mechanism,
    said body having a passage extending therethrough defining a semi-spherically shaped cavity opening at said friction face means at said one end of body,
    a support pin adapted for supporting said body on and spaced from the free end of an actuating arm of the electric brake mechanism,
    said pin having a semi-spherically shaped head seating in said cavity to form a ball and socket joint between said pin and body,
    said pin having a shank extending from said head through said passage with a clearance adapted to permit limited pivotal movement of said body on said pin,
    said pin head having a face at the end thereof remote from said shank disposed adjacent said friction face means of said body when said head is fully seated in said cavity.

2. The electromagnet as set forth in claim 1 wherein said face of said pin head is disposed flush with said friction face means when said head is fully seated in said cavity.

3. The electromagnet as set forth in claim 2 wherein said shank and said body are co-axially aligned when said head is seated in said cavity with said head face flush with said friction face means.

4. The electromagnet set forth in claim 3 wherein said body has annular concentric inner and outer core portions connected by a radial back wall and defining an annular groove receiving said coil therein,
    said cavity ad passage being disposed coaxially with said core portions and centrally of said inner core portion.

5. The electromagnet set forth in claim 4 wherein said pin shank is cylindrical and said passage is also cylindrical between said cavity and the end of said body remote from said one end thereof.

6. In an electric brake mechanism, the combination comprising
    an armature plate adapted for rotation with a part to be braked and having a flat friction face oriented perpendicular to its axis of rotation,
    a lever arm pivotally supported at one end by said brake mechanism and movable in a plane parallel to said face of said armature plate to actuate said brake mechanism, said lever arm being capable of limited deflection out of parallism with said face of said armature,
    an electromagnet comprising a disc-like body of low reluctance magnetic material,
    an electromagnet coil carried in said body,
    friction face means at one end of said body adapted for sliding contact with said face of said plate,
    said body having a passage extending therethrough defining a semi-spherically shaped cavity opening at said friction face means at said one end of body,
    a support pin having a semi-spherically shaped head seating in said cavity to form a ball and socket joint between said pin and body and having a shank extending from said head through said passage to said lever arm,
    said pin and said through-passage having a clearance therebetween adapted to permit limited pivotal movement of said body on said pin, said pin head having a flat face at the end thereof remote from said shank which is oriented flush with said friction face means of said body when said head is fully seated in said cavity,
    and means rigidly securing said shank of said pin to the free end of said lever arm whereby said lever arm deflects in response to movement of said body with said armature plate and causes said head to pry said body axially away from said face of said plate.

References Cited

UNITED STATES PATENTS 3,224,944    4/1966    Brige _____ 335—299
3,298,473    1/1967    Jensen _____ 335—220 XR BERNARD A. GILHEANY, Primary Examiner D. M. MORGAN, Assistant Examiner U.S. Cl. X.R.

192—84, 101; 335—220, 299